Figure 1:
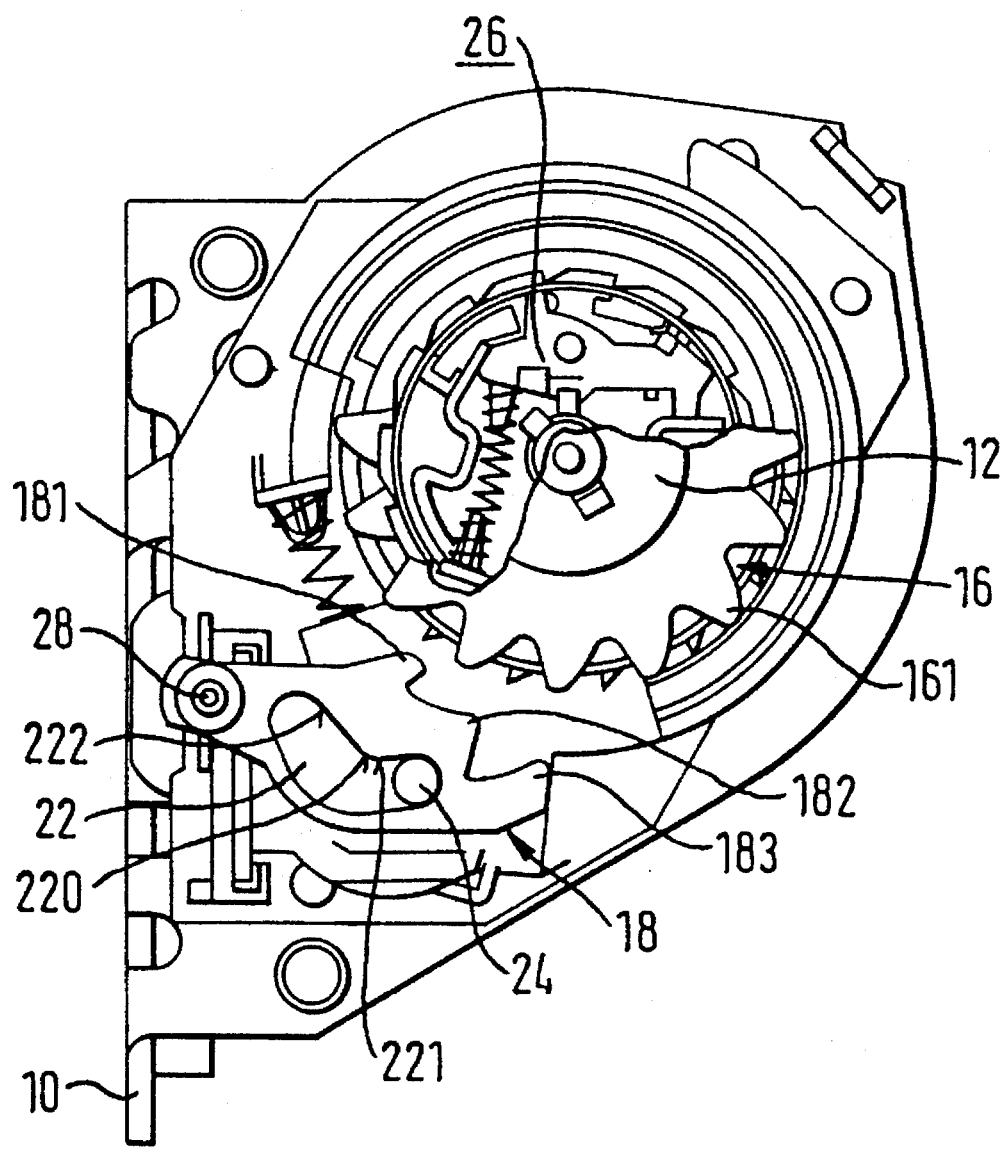

United States Patent
Schmid et al.

[11] Patent Number: 5,593,105
[45] Date of Patent: Jan. 14, 1997

[54] SEAT BELT RETRACTOR FOR PASSENGER RESTRAINING SYSTEMS

[75] Inventors: Johannes Schmid, Schwäbisch Gmünd; Helmut Mika, Waldstetten, both of Germany

[73] Assignee: TRW Repa GmbH, Alfdorf, Germany

[21] Appl. No.: 284,180

[22] Filed: Aug. 2, 1994

[30] Foreign Application Priority Data

Aug. 12, 1993 [DE] Germany ............ 43 27 135.9

[51] Int. Cl.$^6$ .................. B60R 22/40; B65H 75/48
[52] U.S. Cl. ................................................ 242/383.4
[58] Field of Search ............ 242/383.4; 280/806, 280/807; 297/478, 480

[56] References Cited

U.S. PATENT DOCUMENTS

| | | | |
|---|---|---|---|
| 3,995,787 | 12/1976 | Takada | 242/383.4 |
| 4,083,512 | 4/1978 | Rumpf | 242/383.4 |
| 4,467,980 | 8/1984 | Fohl | 242/383.4 |
| 4,726,541 | 2/1988 | Tsukamoto et al. | 242/383.4 |
| 4,895,317 | 1/1990 | Rumpf et al. | 242/383.4 |
| 4,907,820 | 3/1990 | Fohl | 280/806 |
| 5,332,291 | 7/1994 | Fujimura et al. | 242/383.4 |
| 5,351,908 | 10/1994 | Umezawa et al. | 242/383.4 |

Primary Examiner—John P. Darling
Attorney, Agent, or Firm—Tarolli, Sundheim, Covell, Tummino & Szabo

[57] ABSTRACT

On a belt retractor for vehicular seat belt restraining systems having a vehicle and belt sensitive automatic blocking mechanism (26) for the belt reel (12) rotatably mounted in the housing (10) the pawl tooth of a locking pawl (18) first coming into contact with the locking toothing (16) is formed as the control tooth (181). A control link (22) of the locking pawl (18) exhibits a radial stroke which is dimensioned so that the locking pawl (18) is swivelled by the control cam (24) up to first contact of the control tooth (181) with a tooth flank of the locking toothing (16) past which it is further swivelled unsubstantially at the most. After initial contact of the control tooth (181) with a tooth flank of the locking toothing (16) a torque is exerted by rotation of the belt reel on the locking pawl (18) as a result of which the locking pawl (18) is forced to swivel up to positive interlock of the pawl teeth (182, 183) with the locking toothing (16).

9 Claims, 4 Drawing Sheets

SEAT BELT RETRACTOR FOR PASSENGER RESTRAINING SYSTEMS

The present invention relates to a seat belt retractor for passenger restraining systems. More particularly, the invention relates to a seat belt retractor which has a vehicle and belt sensitive automatic blocking mechanism for the belt reel rotatably mounted in a frame, the reel being provided with a ring-shaped locking toothing, and a locking pawl being swivably mounted in the frame.

In known belt retractors the locking pawl is swivelled in synchronism with rotation of the belt reel to engage the locking or ratchet toothing of the belt reel by a control cam engaging the control link of the locking pawl. So that the pawl teeth of the locking pawl do not mismate against the tip of the locking teeth of the belt reel toothing during the positioning movement thereof, the locking toothing and the locking pawl are located in a predetermined position to each other prior to this positioning movement. When the automatic blocking mechanism is released sensitive to both vehicle and belt movements, the locking pawl is swivelled into the locking toothing by means of a control lever. When fast positioning movements are called for there is a delay in such movement of the locking pawl due to the inertia of the control members involved in the movement. This loss of positioning stroke becomes greater the more the belt reel rotation is accelerated. Exceptionally high accelerations of the belt reel rotation and thus high losses in the positioning movement result, for example, following a belt tensioning action due to an increased inverse acceleration of the belt.

This loss of positioning stroke is partly compensated for by the swivelling movement of the locking pawl being advanced with respect to rotation of the belt reel. The angle of rotation of the belt reel for swivelling the locking pawl from its normal rest position up to first contact of the locking tooth is defined as the prepositioning angle. The maximum amount of the prepositioning angle is, however, limited since if it becomes too large seizure of the locking pawl occurs in the blocking position. If namely the prepositioning angle is too large and no high positioning accelerations occur a pawl tooth of the locking pawl may come into contact with the nearest tooth back of a locking tooth when the automatic blocking mechanism is activated before the cam follower has reached the tip of the control cam at the locking pawl.

On the other hand due consideration must be given to dimensioning the prepositioning angle by production tolerances so that only a narrow angular range comes into question.

As a result of the given influencing factors it is necessary that positioning of the locking pawl is checked individually for every belt retractor and the prepositioning angle corrected where necessary.

The present invention provides a seat belt retractor of the aforementioned kind in which a large prepositioning angle is permissible due to simple means of design so that even relatively large production tolerances do not necessitate individual checking or correction of the prepositioning angle.

This is achieved according to the invention for the aforementioned belt retractor in that a) the pawl tooth which first comes into contact with the locking toothing is formed as a control tooth;

b) the control cam exhibits a radial stroke which is dimensioned so that the locking pawl is swivelled by the cam follower up to initial contact of the control tooth with a tooth flank of the locking toothing past which it is further swivelled unsubstantially at the most; and c) after first contact of the control tooth with a tooth flank of the locking toothing a torque is exerted by rotation of the belt reel on the locking pawl as a result of which the locking pawl is forced to swivel up to positive interlock of the pawl teeth with the locking toothing.

The invention is based on the realization that by dividing the positioning stroke into a first section as determined by the control cam and a second section as determined by the contact of the control tooth of the locking pawl on the locking toothing of the belt reel a larger range of the prepositioning angle is possible without the risk of the locking pawl seizing in its blocking positioning.

In accordance with one advantageous embodiment of the invention the statistically established prepositioning angle as defined by the amount of the angle of rotation of the belt reel for swivelling the locking pawl from its rest position up to first contact of the control tooth with a tooth flank of the locking toothing has the same magnitude as the pitch of the locking toothing. In particular the prepositioning angle amounts to between 0.7 and 1.2 times the pitch of the locking toothing.

To ensure an adequate torque by which the locking pawl is forced to swivel up to positive interlocking engagement of the pawl teeth with the locking toothing the angle between the perpendicular to the tooth flank and a line passing through the location of first contact and the swivel axis of the locking pawl amounts to at least 30° and preferably approx. 38° in the region of first contact of the control tooth with a tooth flank of the locking toothing.

It is useful to provide the control tooth with its leading edge receding away from the extension of a line passing through its tip and the center point of the locking toothing, thus enabling the control tooth to slide with low loss on a tooth flank of the locking toothing.

Transferring high forces when the belt reel is blocked by the locking pawl engaging the locking toothing is assured by the locking pawl having two further pawl teeth in addition to the control tooth.

To achieve an optimum range of the prepositioning angle it is of advantage when in the rest position of the locking pawl the control cam forms an angle of approx. 60° with a line passing through the center point of the locking toothing and the axis of the cam follower. More particularly it is of advantage when the coverage of the runout section as measured in the circumferential direction of the locking toothing is roughly twice as large as that of the positioning section of the control link.

Figure 2A:
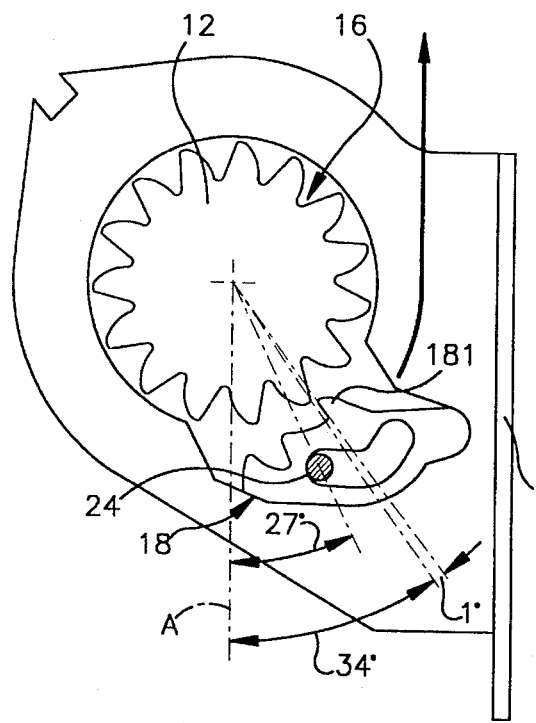
Figure 2B:
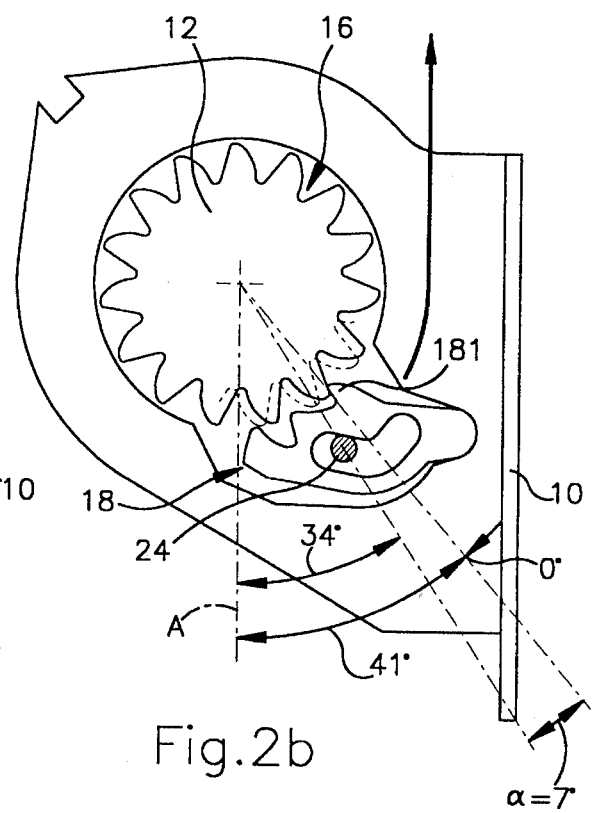
Figure 2C:
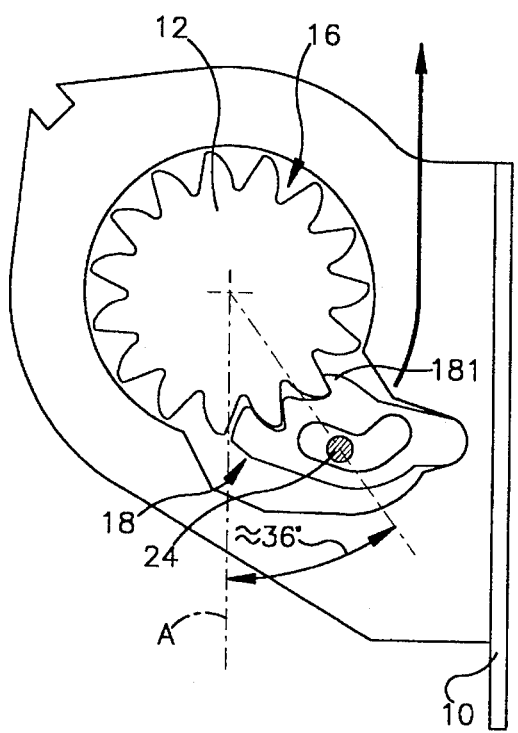
Figure 2D:
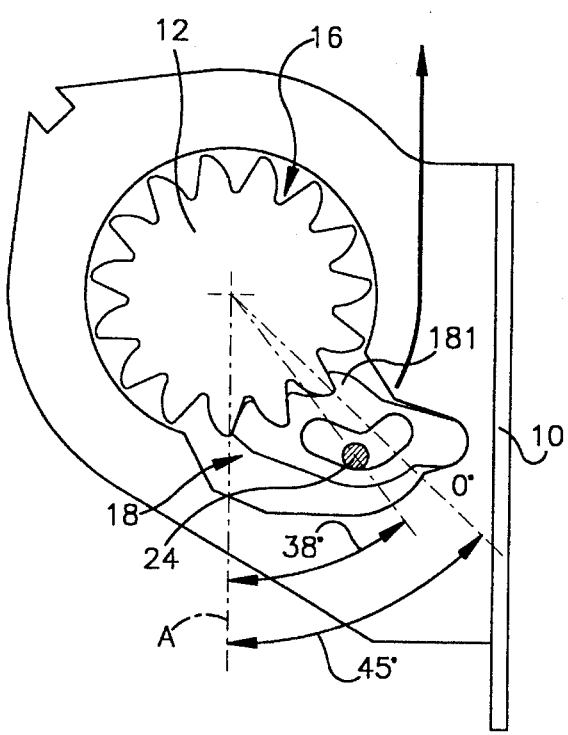
Figure 3C:
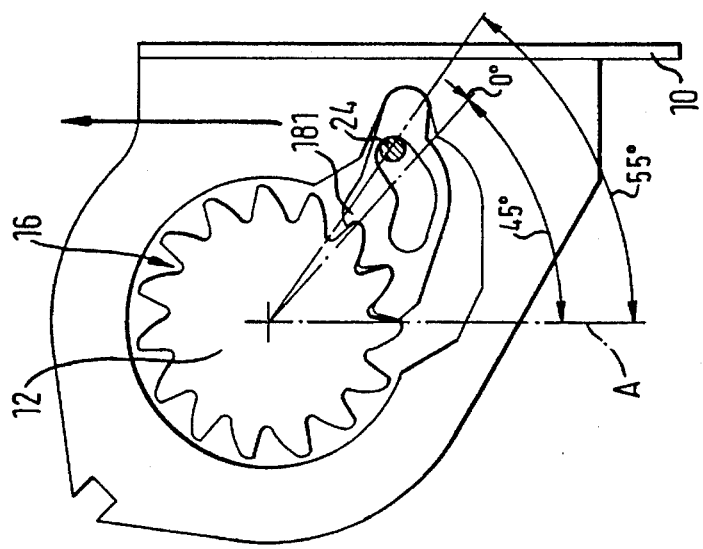
Figure 3B:
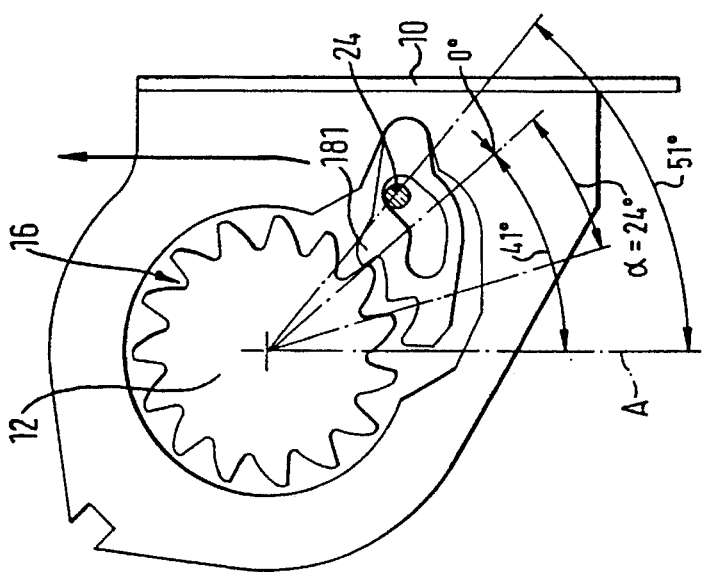
Figure 3A:
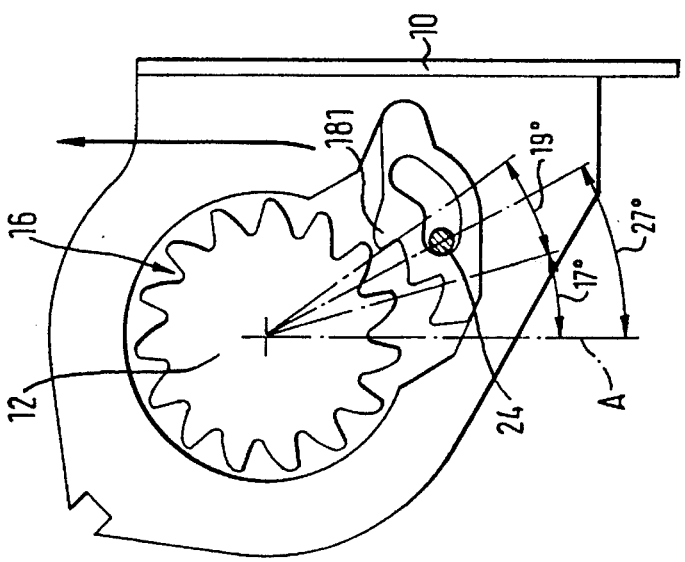
Figure 4:
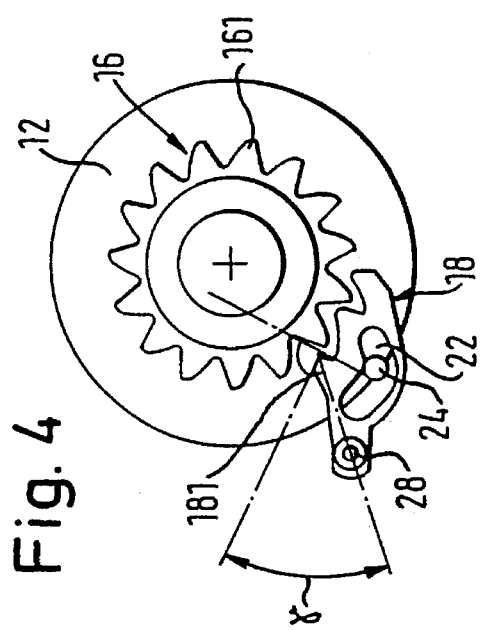
Figure 5:
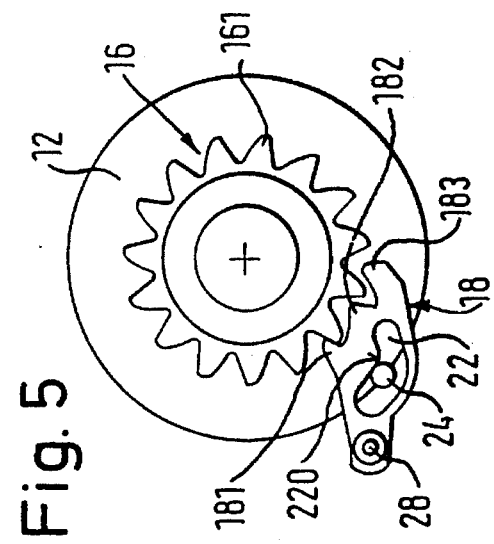
Figure 6:
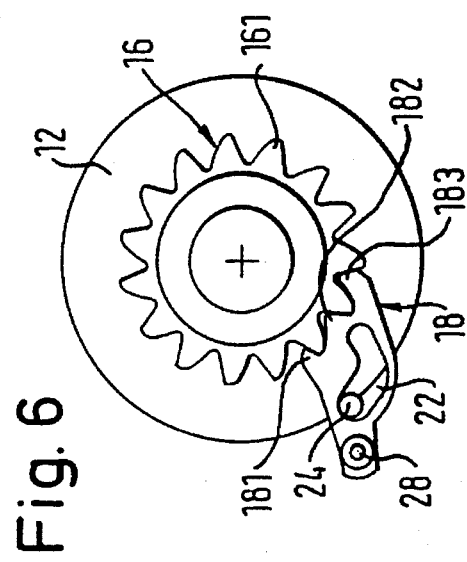

Further features and advantages of the invention will be appreciated from the following description of an embodiment and from the drawing to which reference is made and in which:

FIG. 1 is a partial section side view of a belt retractor according to one embodiment of the invention; and FIGS. 2a thru 3c are rough drawings illustrating the significance of the prepositioning angle for a belt retractor FIGS. 4 thru 6 show the various positioning arrangements of the locking toothing and the locking pawl of the belt retractor shown in FIG. 1.

In FIGS. 1 thru 6 a belt retractor is shown according to one embodiment of the invention. In a housing 10 a belt reel 12 is rotatably mounted on which the belt webbing (not shown) is wound. On both sides of the belt reel 12 a ring-shaped pawl toothing 16 having locking teeth 161 is provided which is configured one-piece with the belt reel 12 as a die cast part. One each locking pawl 18 swivably mounted in the housing 10 is provided for engaging the corresponding locking toothing 16 of the belt reel 12. The two locking pawls 18 are coupled to each other by a connecting rod (not shown) to permit a coordinated swivelling movement of the two locking pawls 18. In addition, each locking pawl 18 is provided with a control tooth 181 and two pawl teeth 182 and 183 and featuring a control cam 22 which is engaged by a cam follower 24 of a vehicle and belt sensitive automatic blocking mechanism of conventional arrangement and thus not further detailed in the following. Via the automatic blocking mechanism 26 and the cam follower 24 the positioning movement of the locking pawls 18 in the locking toothing 16 is controlled. The cam follower 24 slides along the control cam 22 of the locking pawl 16 so that it is moved into the locking toothing 16 of the belt reel 12. For the swivelling movement each locking pawl 18 is provided with a journal 28 mounted in a housing part (not shown).

The control cam 22 of each locking pawl 18 is provided on one side of the tip 220 of the latter with a positioning section 221 on which in the resting position of the locking pawl 18 the distance away from the center point of the locking toothing 16 increases, and on the other side a runout section 222 is provided on which said distance away becomes smaller. The coverage of the runout section 222 as measured in the circumferential direction of the locking toothing 16 is roughly twice as large as that of the positioning section 221. Via the positioning section 221 the control tooth 181 of the locking pawl 18 is swivable in the region of the locking teeth 161 of the locking toothing 16. Via the cam follower 24 engaging the control cam 22 the locking pawl 18 receives a radial stroke which is dimensioned so that the locking pawl 18 is swivelled by the cam follower 24 up to first contact of the control tooth 181 with a tooth flank of a locking tooth 161 of the locking toothing 16 and further on to an insignificant extent at the most.

The swivelling movement of the locking pawls 18 results initially from the movement of the cam follower 24 relative to the control cam 22, as the cam follower 24 bears on the control cam 22 along the positioning section 221 (FIG. 2b). The cam follower 24 bears on and swivels the locking pawl 18 up to the tip 220 of the control cam 22. After this the cam follower 24 moves along the runout section 222 of the control cam 22 until—on rotation of the belt reel 12—the next locking tooth 161 of the locking toothing 16 engages the control tooth 181. Following first contact of the control tooth 181 with a tooth flank of the locking tooth 161 a torque is exerted on the locking pawl 18 as a result of rotation of the belt reel 12 which forces the locking pawl 18 to swivel (upwards as viewed in the drawings), relative to the cam follower 24. The locking pawl 18 moves relative to the cam follower 24 such that the cam follower 24 disengages from the surfaces defining the control cam (FIG. 2c). Continued movement of the locking pawl 18 causes the pawl teeth 182, 183 to move toward positive interlocking engagement with the locking teeth 16. This movement is not due to engagement of the cam follower 24 on the surfaces defining the control cam 22 because the cam follpower 24 is disengaged from the control cam. It is not until the final engagement position (FIG. 2d), i.e., when the pawl teeth 182 and 183 are practically in contact with the bottom of the tooth, that these each come into contact with a tooth flank of a locking tooth 161 of the locking toothing 16 thus blocking the belt reel 12 (FIG. 6).

The special feature of the belt retractor according to the invention will become clear when considering the so-called prepositioning angle. This prepositioning angle is the angle of rotation of the belt reel 12 from commencement of swivelling of the locking pawl 18 from its rest position up to its first contact with the next opposing tooth of the locking toothing 16. The prepositioning angle is established statically, i.e. on slow rotation of the belt reel so that the effects of mass inertia fail to materialize.

Reference is now made to the FIGS. 2a thru 3c which illustrate the positioning action of the locking pawl 18 in its blocking position for a minimum possible prepositioning angle. This minimum possible prepositioning angle is the angle in which it is assured that the control tooth 181 of the locking pawl 18 locates the tooth gap preceding the next tooth on the belt reel 12 which is already in rotation. FIG. 2a shows the starting position of the locking pawl 18. The angles of rotation included in the definition of the prepositioning angle are related to an axis A parallel to the floor of the housing 10. In the starting position as shown in FIG. 2a the angle between the axis A and line passing through the axis of rotation of the belt reel 12 and the tip of its tooth located opposite the control pawl 181 amounts to 34°. The angle of rotation between axis A and a line passing through the axis of rotation of the belt reel 12 and through the cam follower 24 amounts to 27°. The angle of rotation between the tip of the control tooth 181 and the tip of the opposing tooth on the belt reel 12 amounts to roughly 1°. This angle must not become any smaller so that the control tooth 181 is still able to dive into tooth gap preceding the neighboring tooth.

In FIG. 2b the position is shown in which the control tooth 181 has just come into contact with the neighboring tooth on the belt reel 12. Relative to the axis A the angle of the tooth on the belt reel 12 which has come into contact with the control tooth 181 is 41° and the angle of the cam follower 24 is 34°. In FIG. 2c, the parts are in an intermediate position between the positions shown in FIGS. 2b and 2d. For example, the cam follower 24 is at angle of approximately 36°.

In the blocking position shown in FIG. 2d the locking pawl 18 is already in postive interlocking engagement with the locking toothing 16 on the belt reel 12. The angle of the tooth of the locking toothing 16—again relative to the axis A—with which the control tooth 181 has first come into contact now amounts to 45° and the angle of the cam follower 24 is 38°. The prepositioning angle a is the angle of rotation of the belt reel between the positions shown in FIGS. 2a and 2b, i.e. the difference between the angles 41° and 34°, i.e. equalling 7°.

In FIGS. 3a thru 3c the situation is similarly shown for the maximum possible prepositioning angle. The angle of rotation between the tip of the control tooth 181 and the cam follower 24 amounts to 19°. This angle must not become larger so that it is assured that the back of the control tooth 181 does not come up against the tip of the opposing tooth of the locking toothing 16 which would cause the control system to be blocked. For an angular value of 19° the back of the control tooth 181 already touches the back of the opposing tooth of the locking toothing 16. The angle of the tooth of the locking toothing 16 relative to axis A at which the control tooth 181 engages amounts to 17° in this case, and the angle of the cam follower 24 remains unchanged at 27°.

In first contact between the control tooth 181 and the corresponding tooth of the locking toothing 16 the angle of rotation of the tooth of the locking toothing relative to axis A amounts to 41° and the angle of the cam follower 24 is 51°. For the blocking position shown in FIG. 3c these angles amount to 45° and 55° respectively. The resulting maximum possible prepositioning angle a is 41°–17° i.e. 24°. This angle agrees with the pitch of the locking toothing 16: since this comprises 15 locking teeth the pitch is calculated to be 360°:15=24°.

It will be appreciated that the values for the minimum and maximum prepositioning angle may deviate from the aforementioned values, depending on the geometry of the toothings. Significant is mainly the maximum possible value of the prepositioning angle, since the losses occurring in a dynamic positioning action can be compensated by a higher value, these losses possibly attaining such high values as 10° thru 14° for a belt retractor with a belt tensioner.

FIG. 4 shows the condition in which the control tooth 181 has just come into contact with the locking tooth 161. The spacing from the point of attack—i.e. the point at which the control tooth 181 is located on the tooth flank of the locking tooth 161 of the locking toothing 16—to the Addendum circle diameter of the locking toothing 16 amounts to a maximum of roughly 1 mm. It can clearly be seen from FIG. 4 that the cam follower 24 is located at the tip 220 of the control cam 22 when the control tooth 181 is in contact with the locking tooth 161 of the locking toothing 16. Also shown in FIG. 4 is the angle c which is formed between the perpendicular to the tooth flank of the locking tooth 161 at the point of contact with the control tooth 181 and a line passing through this point and the swivel axis of the locking pawl 18 and is preferably roughly 38°. The magnitude of this angle c ensures sufficient torque being exerted on the locking pawl 18 by rotation of the belt reel to dictate positive engagement of the pawl teeth 182, 183 with the locking toothing 16 by forced swivelling with the locking pawl 18.

In FIG. 5 the cam follower 24 has already passed the tip 220 and the locking pawl 18 is now swivelled into the engaging position merely by the aforementioned resulting forced torque. In the position of engagement of the locking pawl 18 in the locking toothing 16—see FIG. 6—reliable positive interlocking exists due to the toothing geometry of the control tooth 181 and that of the pawl teeth 182 and 183 on the one hand and that of the locking teeth 161 on the other.

As a result of the belt retractor according to the invention a prepositioning angle range is simply produced which amounts to more than twice the possible value for a conventional belt retractor at which the complete positioning stroke is affected by the control link of the locking pawl. The prepositioning angle can thus be selected so large that it is also sufficient for very high rotary accelerations of the belt reel but still being within the permissible range of tolerance in which no clamping of the locking pawl occurs.

What is claimed is:

1. A seat belt retractor comprising a frame, a belt reel rotatably mounted in said frame about a fixed axis of rotation and provided with peripheral ratchet teeth, a locking pawl provided with at least two locking teeth and swivably mounted on said frame about a fixed swivel axis to be movable between a locking position in engagement with said ratchet teeth and a normal position retracted from said ratchet teeth, and a control mechanism for moving said locking pawl between said locking and normal positions, said locking pawl having a cam and said control mechanism comprising a cam follower engaging said cam and constrained to move along a predetermined path in synchronism with rotation of said belt reel in an uncoiling direction, and said cam being shaped in relation to said predetermined path so that upon movement of said cam follower along said predetermined path a) said locking pawl is forcingly moved from said normal position to an initial engagement position where one of said locking teeth has a tip portion starting to contact a flank portion of one of said ratchet teeth, and b) said cam disengages from said cam follower upon further pivotal movement of said locking pawl caused by rotation of said belt reel until said locking teeth fully engage said ratchet teeth.

2. The seat belt retractor of claim 1, wherein said locking pawl has a total of three locking teeth.

3. A seat belt retractor comprising a frame, a belt reel rotatably mounted in said frame about a fixed axis of rotation and provided with peripheral ratchet teeth, a locking pawl provided with at least two locking teeth and swivably mounted on said frame about a fixed swivel axis to be movable between a locking position in engagement with said ratchet teeth and a normal position retracted from said ratchet teeth, and a control mechanism for moving said locking pawl between said locking and normal positions, said locking pawl having a cam and said control mechanism comprising a cam follower engaging said cam and constrained to move along a predetermined path in synchronism with rotation of said belt reel in an uncoiling direction;

said cam being shaped in relation to said predetermined path so that upon movement of said cam follower along said predetermined path said locking pawl is forcingly moved from said normal position to an initial engagement position where one of said locking teeth has a tip portion starting to contact a flank portion of one of said ratchet teeth, and said cam disengages from said cam follower upon further pivotal movement of said locking pawl caused by rotation of said belt reel until said locking teeth fully engage said ratchet teeth;

a prepositioning angle being defined by an angle of slow belt reel rotation from a point where said locking pawl starts to move out of said normal position to a point of first contact between one of said locking teeth and one of said ratchet teeth, and said ratchet teeth having a fixed pitch and said prepositioning angle being of the same magnitude as said pitch.

4. The seat belt retractor of claim 3, wherein said prepositioning angle is in a range from 0.7 and 1.2 times said ratchet teeth pitch.

5. A seat belt retractor comprising a frame, a belt reel rotatably mounted in said frame about a fixed axis of rotation and provided with peripheral ratchet teeth, a locking pawl provided with at least two locking teeth and swivably mounted on said frame about a fixed swivel axis to be movable between a locking position in engagement with said ratchet teeth and a normal position retracted from said ratchet teeth, and a control mechanism for moving said locking pawl between said locking and normal positions, said locking pawl having a cam and said control mechanism comprising a cam follower engaging said cam and constrained to move along a predetermined path in synchronism with rotation of said belt reel in an uncoiling direction;

said cam being shaped in relation to said predetermined path so that upon movement of said cam follower along said predetermined path said locking pawl is forcingly moved from said normal position to an initial engagement position where one of said locking teeth has a tip portion starting to contact a flank portion of one of said ratchet teeth, and said cam disengages from said cam follower upon further pivotal movement of said locking pawl caused by rotation of said belt reel until said locking teeth fully engage said ratchet teeth; and an angle of at least 30° and not more than 45° being formed at a point of starting contact between said flank portion of one of said ratchet teeth and said tip portion of one of said locking teeth, between a line perpendicular to said flank portion and a line passing through this point of starting contact and the swivel axis of said locking pawl.

6. The seat belt retractor of claim 5, wherein said one locking pawl tooth which first contacts one of said ratchet teeth has a leading edge which recedes away from a line passing through the tip of said locking pawl tooth and the axis of rotation of said belt reel.

7. A seat belt retractor comprising a frame, a belt reel rotatably mounted in said frame about a fixed axis of rotation and provided with peripheral ratchet teeth, a locking pawl provided with at least two locking teeth and swivably mounted on said frame about a fixed swivel axis to be movable between a locking position in engagement with said ratchet teeth and a normal position retracted from said ratchet teeth, and a control mechanism for moving said locking pawl between said locking and normal positions, said locking pawl having a cam and said control mechanism comprising a cam follower engaging said cam and constrained to move along a predetermined path in synchronism with rotation of said belt reel in an uncoiling direction;

said cam being shaped in relation to said predetermined path so that upon movement of said cam follower along said predetermined path said locking pawl is forcingly moved from said normal position to an initial engagement position where one of said locking teeth has a tip portion starting to contact a flank portion of one of said ratchet teeth, and said cam disengages from said cam follower upon further pivotal movement of said locking pawl caused by rotation of said belt reel until said locking teeth fully engage said ratchet teeth;

said cam having a first section whereon the distance from said axis of rotation increases, a second section whereon the distance from said axis of rotation decreases and an intermediate section interconnecting said first and second sections and where the distance from said axis of rotation is at maximum.

8. The seat belt retractor of claim 7, wherein said first cam section forms an angle of substantially 60° with a line passing through said axis of rotation and said cam follower when said locking pawl is in said normal position.

9. The seat belt retractor of claim 7, wherein said first cam section has an extension which is substantially greater than that of said second cam section.

* * * * *